(12) United States Patent
Heim et al.

(10) Patent No.: US 7,631,553 B2
(45) Date of Patent: Dec. 15, 2009

(54) BEARING ARRANGEMENT FOR MOUNTING AT LEAST ONE MACHINE ELEMENTS ON A SUPPORT

(75) Inventors: Jens Heim, Bergrheinfeld (DE); Peter Niebling, Bad Kissingen (DE); Gottfried Ruoff, Oberwerrn (DE); Darius Dlugai, Schweinfurt (DE); Christian Mock, Bergrheinfeld (DE)

(73) Assignee: Schaeffler KG, Herzogenaurach (DE)

( * ) Notice: Subject to any disclaimer, the term of this patent is extended or adjusted under 35 U.S.C. 154(b) by 13 days.

(21) Appl. No.: 11/995,082

(22) PCT Filed: Jul. 1, 2006

(86) PCT No.: PCT/DE2006/001144

§ 371 (c)(1),
(2), (4) Date: Jan. 24, 2008

(87) PCT Pub. No.: WO2007/006262

PCT Pub. Date: Jan. 18, 2007

(65) Prior Publication Data
US 2008/0202226 A1 Aug. 28, 2008

(30) Foreign Application Priority Data
Jul. 9, 2005 (DE) .................... 10 2005 032 222

(51) Int. Cl.
*G01M 13/04* (2006.01)
(52) U.S. Cl. .................. 73/115.07; 73/114.81
(58) Field of Classification Search .......... 73/114.77, 73/114.81, 115.01, 115.07, 115.08
See application file for complete search history.

(56) References Cited

U.S. PATENT DOCUMENTS

| 4,735,102 | A | 4/1988 | Koenig |
| 6,701,780 | B2 * | 3/2004 | Hofmann et al. ............... 73/146 |
| 7,178,413 | B2 * | 2/2007 | Hofmann et al. ....... 73/862.541 |
| 7,287,908 | B2 * | 10/2007 | Niebling et al. ............. 384/448 |
| 2005/0047692 | A1 * | 3/2005 | Niebling et al. ............. 384/448 |
| 2006/0037411 | A1 * | 2/2006 | Hofmann et al. ....... 73/862.541 |
| 2008/0031556 | A1 * | 2/2008 | Heim et al. .................. 384/448 |
| 2008/0166078 | A1 * | 7/2008 | Niebling et al. ............. 384/448 |
| 2008/0304779 | A1 * | 12/2008 | Heim et al. .................. 384/448 |
| 2009/0038414 | A1 * | 2/2009 | Ozaki et al. ............ 73/862.381 |
| 2009/0114004 | A1 * | 5/2009 | Ozaki et al. .............. 73/117.01 |

FOREIGN PATENT DOCUMENTS

| DE | 27 43 813 | 4/1979 |
| DE | 88 16 453 | 7/1989 |
| WO | 02/04906 | 1/2002 |
| WO | 02/44678 | 6/2002 |
| WO | 02/057730 | 7/2002 |

* cited by examiner

*Primary Examiner*—Eric S McCall
(74) *Attorney, Agent, or Firm*—Lucas & Mercanti, LLP (57) ABSTRACT

The invention relates to a bearing arrangement for mounting at least one machine element on a support, wherein the machine element is movably mounted on the support, wherein the bearing arrangement is provided with at least one measuring sleeve and with at least one measuring element on the measuring sleeve, wherein the measuring sleeve is formed separately from the support and wherein the measuring element is provided at least for measuring physical parameters and processes in the bearing arrangement.

14 Claims, 8 Drawing Sheets

BEARING ARRANGEMENT FOR MOUNTING AT LEAST ONE MACHINE ELEMENTS ON A SUPPORT

FIELD OF THE INVENTION

Bearing arrangement for mounting at least one machine element on a support, the machine element being mounted movably on the support, the bearing arrangement having at least one measuring sleeve and having at least one measuring element on the measuring sleeve, the measuring sleeve being configured separately from the support and the measuring element being provided at least for measuring physical variables and processes in the bearing arrangement.

BACKGROUND OF THE INVENTION

A bearing arrangement of this type is described in the abstract of the publication of Japanese patent application JP58017328 A. It is customary to arrange the measuring sleeves between the bearing and the support for the bearing. The support is as a rule a housing or that part of a housing, in which or on which the machine element is arranged. However, the support can also be a separate bearing block or the like, by way of which the machine element is mounted. The machine element is, for example, an axle or shaft which is mounted by means of the bearing arrangement rotatably with respect to the support. The respective measuring sleeve in bearing arrangements according to the prior art is arranged radially between the outer ring of the bearing and the seat in the housing. The measuring sleeve is provided, for example, with strain gauges which react to elastic deformation of the measuring sleeve. The dimensional changes result from reaction supportive forces and displacements which are caused by the machine element which is loaded with forces/moments in the bearing.

The accuracy of the measured results in arrangements of this type of the prior art is dependent on many factors and therefore insufficient in some circumstances. The measured results are dependent, for example, on the rigidity of the support and on the installation tolerances, on temperature influences and on coefficients of thermal expansion of the materials of the housing and of the bearing ring.

Strain elements or the like are calibrated to a predefined initial state before operation of the bearing arrangement. The measuring device in bearing arrangements of the prior art is realized in transmissions on the bearing arrangement which has already been completely mounted in the housing, since, for example, the prestress of a press fit or the prestresses by means of screw connections on the measuring sleeve have to be taken into consideration during the calibration. The prestress which is reflected in deformations in the bearing is dependent on the above-mentioned tolerances and fluctuates from the installation in one transmission to the next installation in another transmission, with the result that the measuring devices have to be adapted individually for each transmission. The time for mounting the transmission is increased. Bearing arrangements having measuring devices of the generic type have therefore not established themselves so far in transmissions of mass production for cost reasons.

In a prestressed bearing arrangement, in which the coefficient of thermal expansion of the material of the measuring sleeve differs from the coefficient of thermal expansion of the bearing ring or the housing, changes in the operating temperature can lead to misleading measured results. It is possible, for example, that the prestress falls or increases on account of this difference. It is intended to measure only the stresses from the loadings on the bearing. Since, however, the prestress in the bearing arrangement can change at the same time as the loadings on the bearing, it cannot be determined clearly which influences have led to the measured results.

The installation space for the corresponding measuring elements or a corresponding sensor system is limited. For the measuring elements, a region which is correspondingly free of loadings has to be provided between the bearing ring and the housing, since the sensitive measuring elements, such as strain gauges, cannot be loaded by pressure, for example.

The outer ring and the measuring sleeve tend to migrate on the circumferential side, with the result that, for example, cable connections to the measuring elements can be subjected to a tensile load and destroyed over time as a result of the migration. The routing of the cables to and from the sensor system is difficult, since the cable leadthroughs in transmissions, for example, have to be sealed.

SUMMARY OF THE INVENTION

It is therefore the object of the invention to provide a bearing arrangement, with which the above-mentioned disadvantages are avoided.

The object is achieved by the features of claim 1. The bearing arrangement is received on the measuring sleeve. The machine element or a plurality of machine elements is/are mounted in the measuring sleeve by means of one or a plurality of bearings of the bearing arrangement. The measuring sleeve is fixed to the support, for example to a wall or to an intermediate wall of a transmission. The support can also be a pin, a shaft or the like, on which a machine element, such as a wheel, is mounted rotatably by means of the bearing arrangement. The bearing arrangement according to the invention is particularly well suited for mounting transmission shafts in transmissions.

The measuring sleeve carries the bearing. The machine element or elements is/are mounted in or on the measuring sleeve. All operating conditions, such as bearing support and reaction forces, displacements in the bearing or of the bearing and possibly temperature changes, are transmitted to the measuring sleeve without being influenced. The operating conditions can be measured at the measuring sleeve in an unadulterated manner, since the measuring sleeve with the bearing is connected by way of the bearing only on one side to the support and is therefore as far as possible free of the disruptive influences from the housing, for example from a tolerance-dependent press fit. The corresponding reactions from forces, moments and displacements at the measuring sleeve are not influenced directly by the surrounding construction.

The measuring arrangement can be calibrated before mounting on the support, since, for example, the corresponding plays in the bearing are already set before mounting on the housing. The bearing also still has these plays in an unchanged manner after mounting. The prestress will no longer change as a result of the installation, since the bearing is not pressed into a housing seat. This is significant, in particular, if bearing arrangements of this type are used in vehicle transmissions. Moreover, the measuring sleeve provides sufficient space for the arrangement of the measuring elements, such as for measuring sensors and for other sensors, and can be shielded or protected against external influences in a satisfactory manner.

The measuring sleeve itself is preferably of hollow-cylindrical configuration. An outer ring or outer rings of the bearing/the bearings is/are seated in the measuring sleeve. Alternative, one or more inner rings are seated on the measuring sleeve. One refinement of the invention provides for the measuring sleeve to be a constituent part of the bearing. The measuring sleeve has at least one but preferably two raceways. Each of the raceways is provided for one row of rolling bodies of the bearing in each case. The measuring sleeve is an inner ring if the raceway is formed circumferentially on the outside of the measuring sleeve or, as an alternative, is an outer ring, on which the raceway is formed circumferentially on the inside of the measuring sleeve.

The measuring sleeve is preferably a component which is produced from sheet metal by cold forming, is preferably of bowl-like configuration as a drawn part, and has a base and a collar. The collar which is preferably oriented radially to the outside is configured as a flange. The bearing or a seat of the bearing is shielded by way of the base against external influences. The collar is configured toward the flange, by way of which the bearing arrangement is flange-connected to the support, for example to a transmission housing. The sleeve is made, for example, from steel which can be drawn and optionally from ferromagnetic or nonferromagnetic steel.

The sleeve and/or the bearing ring are/is coated, for example, with a sensor layer. Sensor layers are to be understood as all layers which change their properties in a readable manner in the event of changes of materials or physical variables.

As a further refinement of the invention provides, the bearing is formed from two bearing rings which are arranged concentrically with respect to one another and are of sleeve-shaped configuration. Both rings are preferably drawn parts and have the corresponding raceways for the rolling bodies. One of the sleeves is provided with the flange, by way of which the bearing arrangement is fixed to the support. One of the bearing rings or, as an alternative, both of the bearing rings is/are configured as measuring sleeve.

In the context of the bearing arrangement according to the invention, the measuring sleeve is to be understood as a sleeve, on which changes to one or more physical variables or processes are measured either directly or indirectly by means of a corresponding sensor system. However, a measuring sleeve is also a sleeve which is a carrier for a sensor system, by way of which changes in state variables and/or processes which take place away from the sleeve are sensed. Combinations of the above-mentioned refinements are also conceivable. Examples are as follows:

The measuring sleeve is a strain sleeve which is equipped with corresponding strain sensors. The strain sleeve reacts to the loadings of the machine element by elastic deformations. The deformations are sensed by the sensors on the sleeve and are forwarded to a corresponding evaluation device in the bearing arrangement or outside the bearing arrangement. The expanding behavior of strain sleeves of this type can be influenced in a targeted manner by a corresponding design of expanding sections of the measuring sleeve. This is possible, for example, by predefined material cross sections or by the targeted introduction of slots and similar interruptions or weakened sections of the structure of the strain sleeve.

Variables which are to be determined in/on the structure of the strain sleeve are sensed on the measuring sleeve by way of corresponding sensors directly or in the immediate vicinity of the measuring sleeve. Variables of this type are, for example, changes in the magnetism of the strain sleeve, operating temperatures or vibrations of the bearing which are transmitted to the measuring sleeve. Measuring arrangements of this type supply very accurate results, in particular, in bearing arrangements, in which the measuring sleeve at the same time has the raceway/raceways of the corresponding bearing.

A sensor or a plurality of sensors or other sensing elements are placed on the measuring sleeve, for example on the sleeve and/or on the flange and/or on the base. The sensors are directed toward signal generators through the wall of the measuring sleeve or through a recess in the measuring sleeve. Signal generators of this type are, for example, encoders for rotational speed measurement or optical measuring arrangements. Here, the measuring sleeve is fixed relative to the support. Here, the encoder is arranged on the rotating bearing ring.

The measuring sleeve is provided with at least one or with a plurality of measuring gaps or measuring openings of a defined and variable passage cross section. A measuring optical system, for example a light source, and a suitable sensor are directed toward the measuring openings. The measuring openings are made in sections of the measuring sleeve which are expected to be subjected to a tensile or compressive load on account of the bearing reactions. The passage cross section is enlarged or reduced in one or two directions as a result of the stresses which are produced on account of these reactions. These changes are sensed by the sensor/sensors and are forwarded to a corresponding evaluation device.

On account of loadings, individual sections of the measuring sleeve change their position by tilting or by twisting or by expansion or by compression relative to one another. These changes are sensed by way of a corresponding sensor system. It is therefore conceivable to sense changes in the position of the cylindrical measuring sleeve with respect to the flange as a result of angular measurements. Here, both measuring arrangements can be measured for measuring deviations from the normal position of the rotational axis in the bearing arrangement, such as tilting and deflection, for example by angular measurement, and also rotations with respect to one another about the rotational axis, for example by radian measure.

The displacements of individual components of the bearing arrangement relative to one another are measured. Changes of this type are, for example, the tilting of the inner ring with respect to the outer ring which is fixed on the support or the tilting of the outer ring with respect to the inner ring which is fixed on the support. Changes in the axial spacing of the inner ring, a shaft or an axle from the base of the measuring sleeve can also be measured. It is conceivable, for example, that the outer ring of the bearing arrangement is at the same time the measuring sleeve, on which the sensor system is arranged. Axial approaches of the inner ring to the base of the measuring sleeve or radial approaches of the inner ring to the cylindrical measuring sleeve are detected on the outside by way of the sensor system.

The above-mentioned arrangements can also be combined as desired.

BRIEF DESCRIPTION OF THE DRAWINGS

The present invention will be better understood and appreciated by reading the following detailed description in conjunction with the accompanying drawings, in which.

DETAILED DESCRIPTION OF THE INVENTION

The invention is explained in greater detail in the following text using exemplary embodiments.

Figure 1:
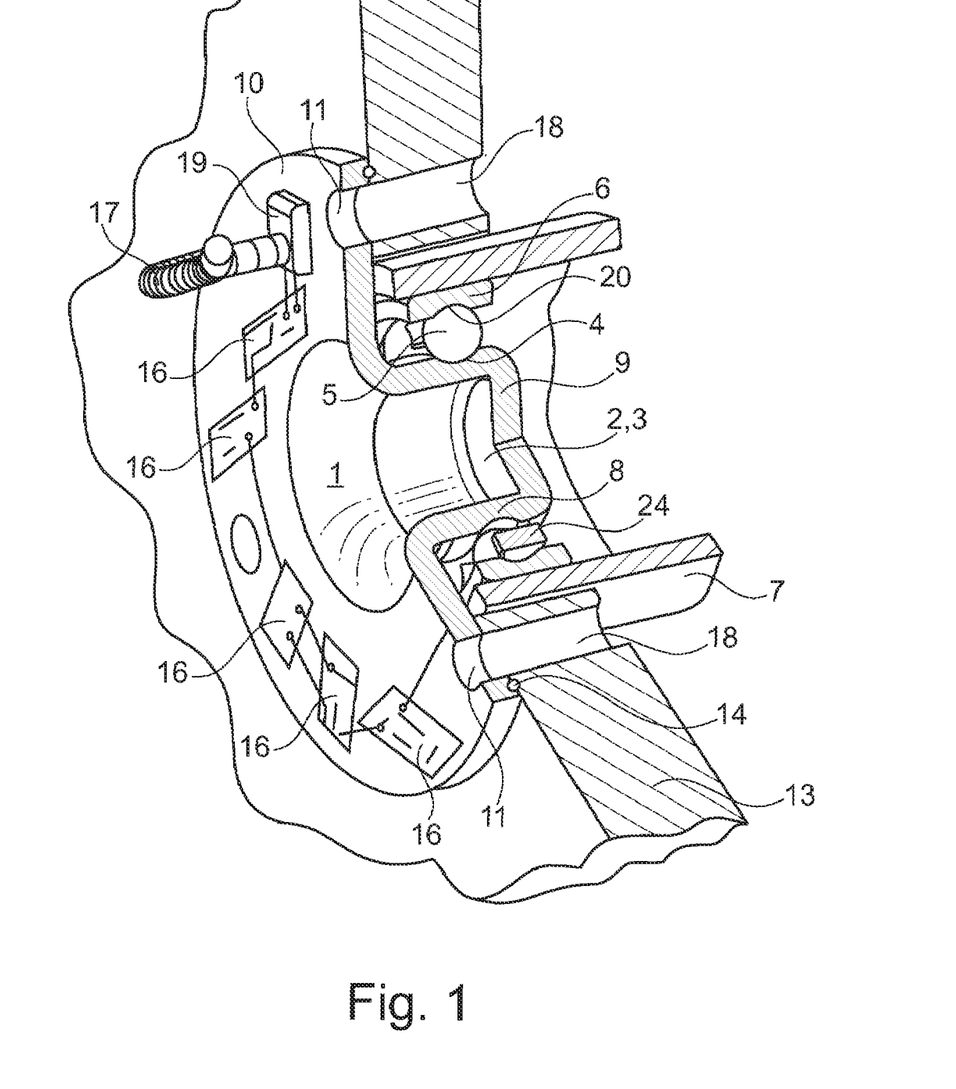
FIG. 1 illustrates the bearing arrangement where an inner bearing ring is a measuring sleeve.

FIG. 1 shows a bearing arrangement 1, in which an inner bearing ring 2 is the measuring sleeve 3. The measuring sleeve 3 has a raceway 4 on the outside for a row of rolling bodies 5 in the form of balls which are held in a cage 24, The raceway 4 is preferably inserted in the measuring sleeve 3 without cutting.

The inner bearing ring 2 is surrounded by an outer bearing ring 6 of the bearing arrangement 1. A raceway 20 for the rolling bodies 5 is formed on the inside of the outer bearing ring 6. The outer bearing ring 6 is pressed into a machine element 7. The machine element 7 is shown in a very simplified manner as a hollow cylinder and can be, for example, a hollow shaft of a transmission.

The measuring sleeve 3 is a drawn part of bowl-like configuration having a hollow-cylindrical section 8, having a base 9 and having a radially outwardly directed flange 10.

The radial flange 10 is provided with through holes 11. Fastening elements (not shown), such as threaded bolts, engage through the through holes 11 and into corresponding fastening holes 18 of the support 13. The bearing arrangement 1 is fastened by way of the flange 10 to the support 13 (shown only in basic form).

The support 13 is, for example, a constituent part of a transmission housing. The measuring sleeve 3 is fixed on the outside to the support 13 and protrudes freely with the hollow-cylindrical section 8 through a hole 15. The connection is sealed with a seal 14.

A sensor system 19 and measuring elements 16 are attached on the flange 10. The measuring elements 16 are, for example, strain elements. The machine element 7 is supported in the loaded and unloaded state on the measuring sleeve 3 via the rolling bodies 5. The loadings of the measuring sleeve 3 lead to tensile or compressive stresses on the flange 10 and are registered by the measuring elements 16. The measured results from deformations are collated and forwarded via a line 17 to an evaluation unit (not shown) and evaluated accordingly.

Figure 2:
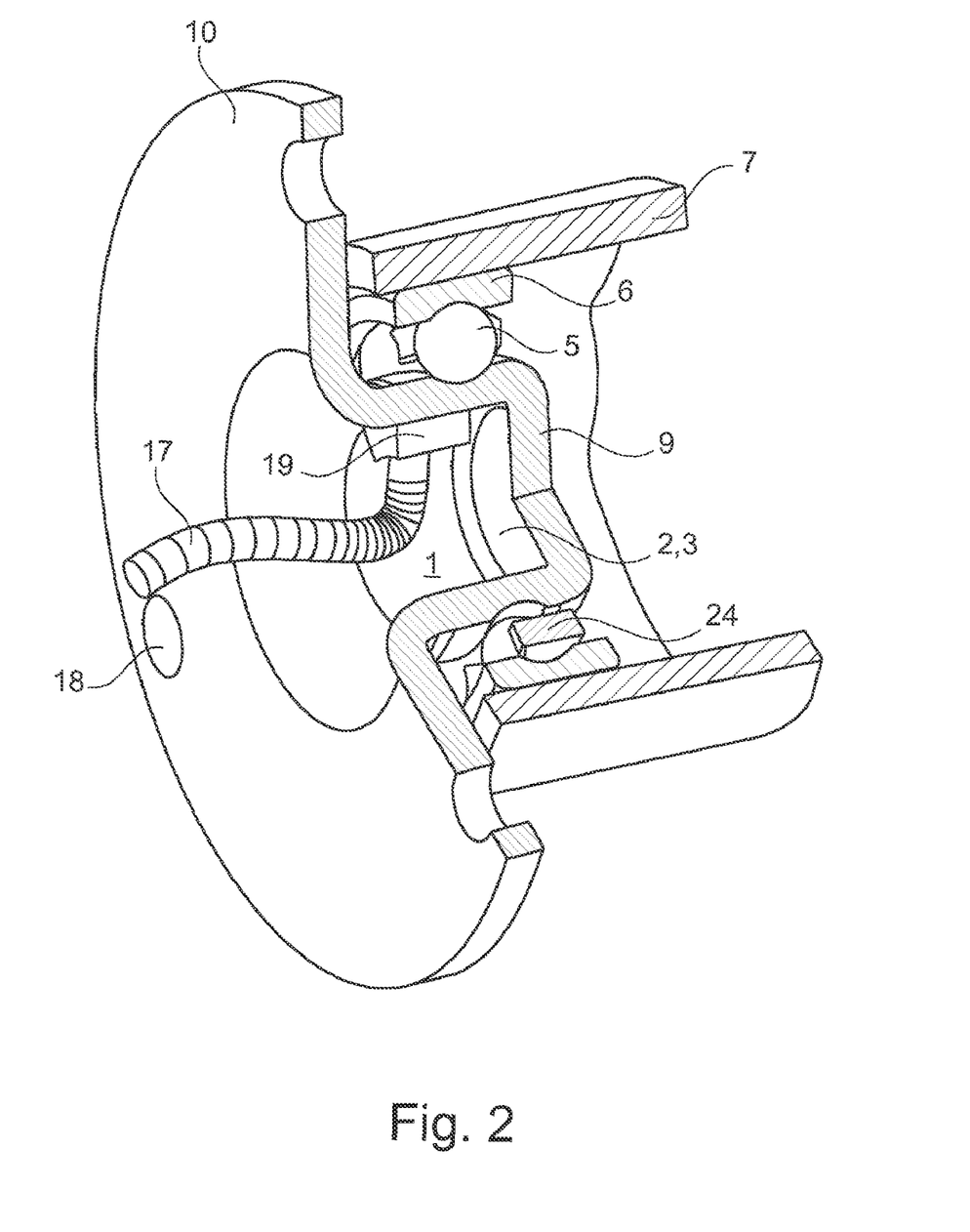
FIG. 2 illustrates an alternative arrangement of the bearing arrangement sensor system on the measuring sleeve.

FIG. 2 shows an alternative arrangement of the sensor system on the measuring sleeve 3. The sensor system 19 is attached on the inside in the measuring sleeve 3 in the hollow-cylindrical section 8 in the immediate vicinity of the raceway 20 and is therefore suitable, for example, for measuring deformations or sound on the inner ring of the bearing arrangement.

Figure 3:
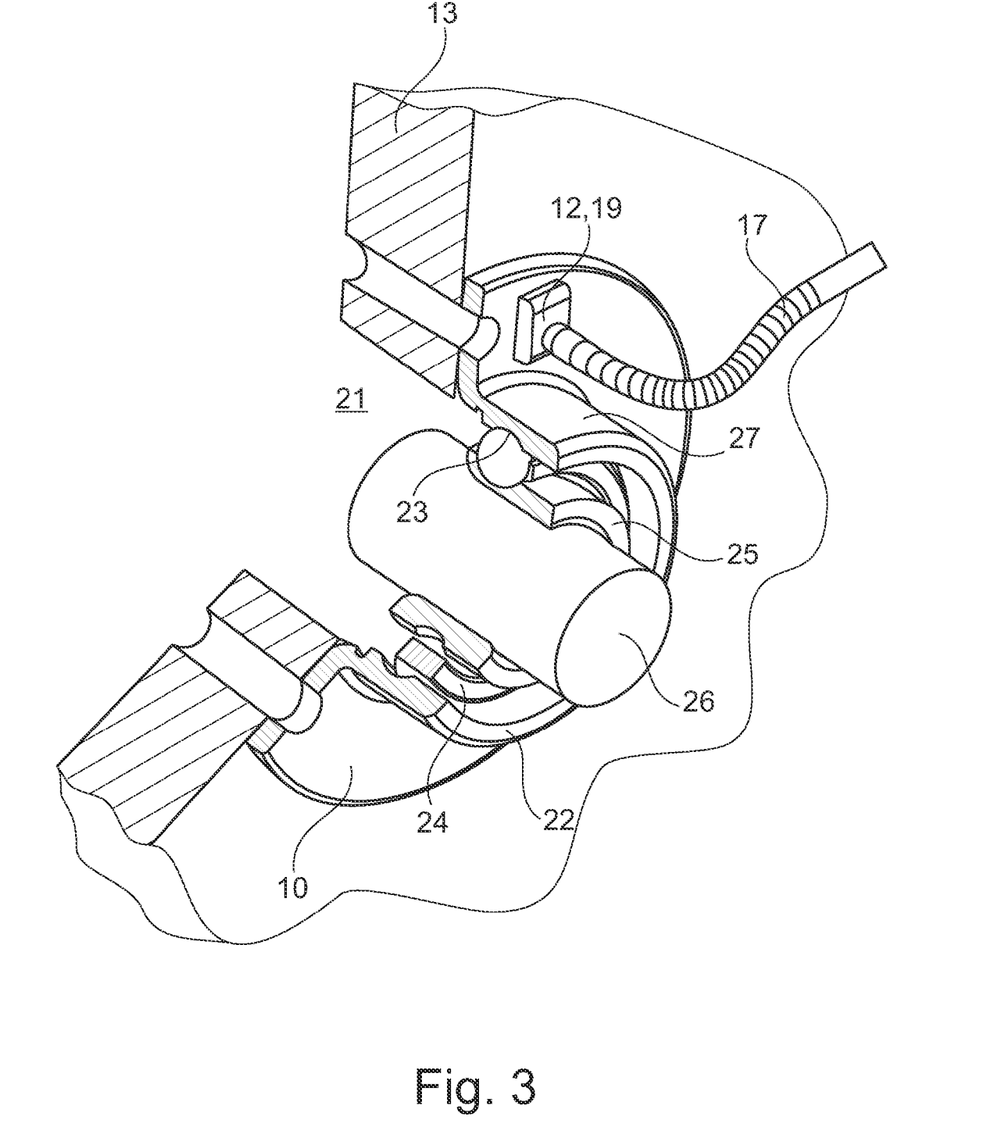
FIG. 3 illustrates the bearing ring arrangement having a measuring sleeve with the sensor system or measuring system fixed on a flange.
Figure 4:
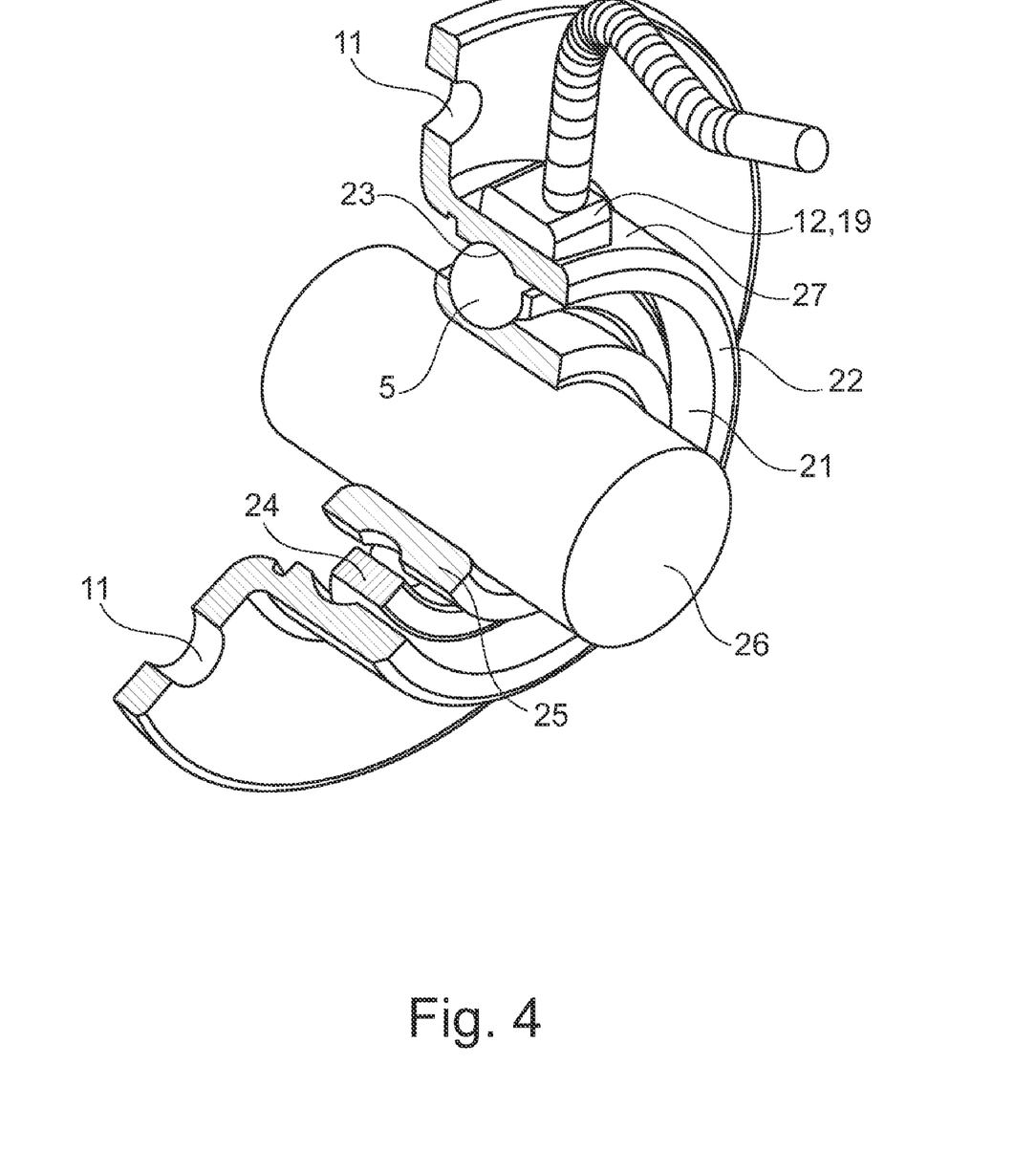
FIG. 4 illustrates the bearing ring arrangement having a measuring sleeve with the sensor system or measuring system arranged on a hollow-cylindrical section of the measuring sleeve.

FIGS. 3 and 4 show a bearing arrangement 21 having a measuring sleeve 22. The measuring sleeve 22 has a raceway 23 for the rolling bodies 5 on the inside. The rolling bodies 5 are guided in the cage 24 and are arranged radially between the measuring sleeve 22 and an inner ring 25. The inner ring 25 is seated on a machine element 26 in the form of a shaft. The measuring sleeve 22 has the radially outwardly directed flange 10 which has through holes 11 and by way of which the bearing arrangement 21 is placed on the support 13 on the inside or outside.

The sensor system 19 or a measuring element 12 is fixed, for example, on the flange 10 in the arrangement according to FIG. 3 and is arranged on a hollow-cylindrical section 27 of the measuring sleeve 22 in the arrangement according to FIG. 4, as an alternative to FIG. 3.

Figure 5:
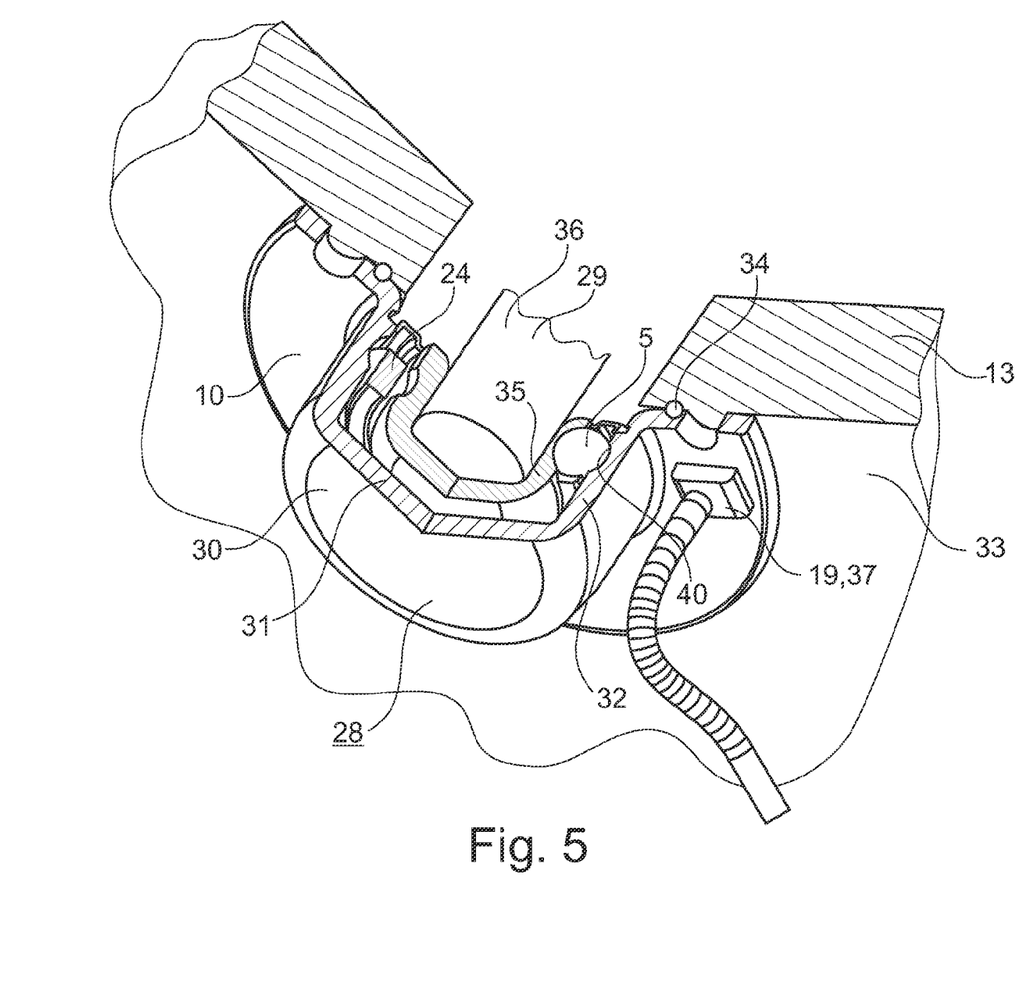
FIG. 5 illustrates the bearing arrangement outwardly closed being flange-connected on the outside to a support.
Figure 6:
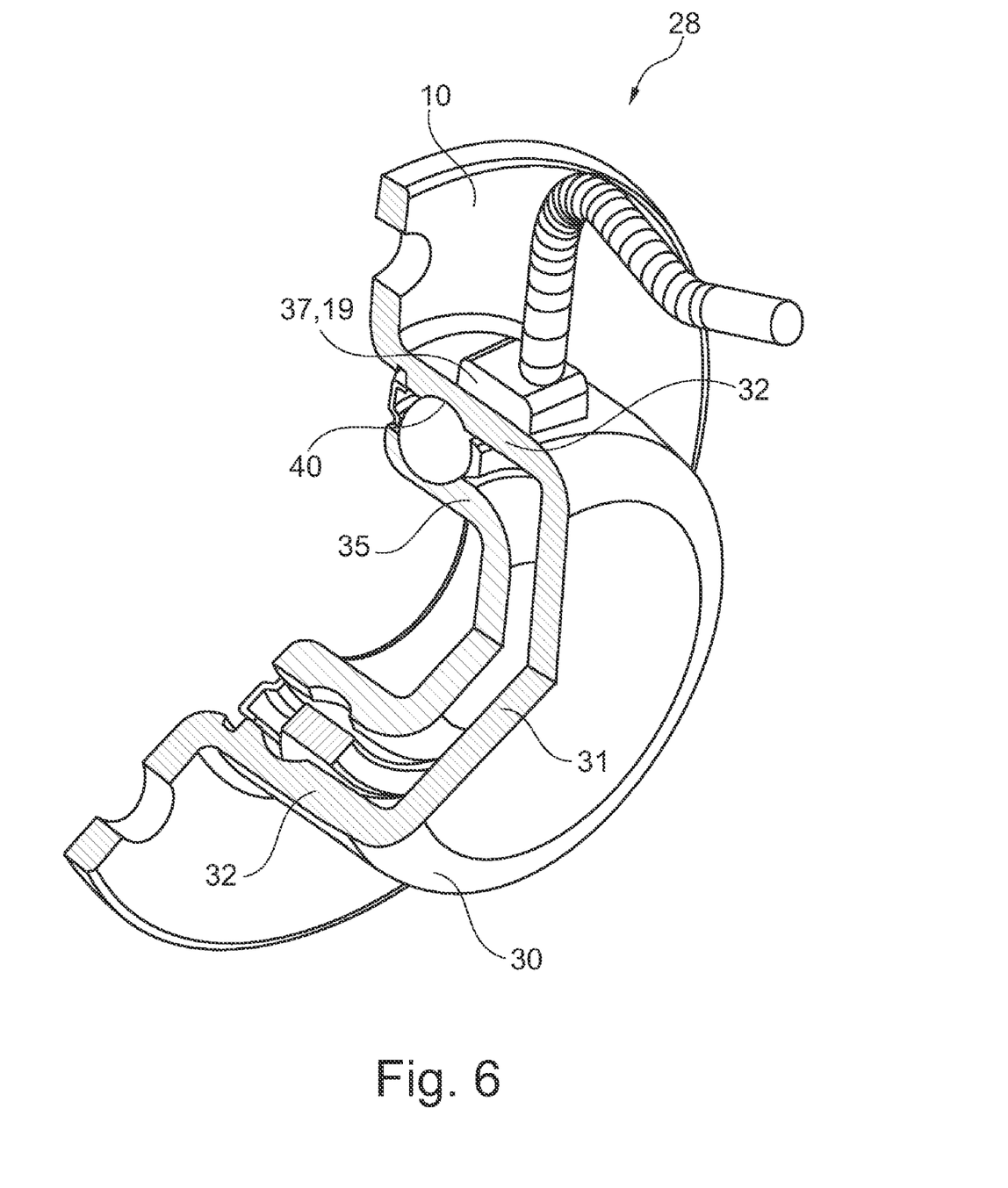
FIG. 6 illustrates an alternate view of the bearing arrangement outwardly closed being flange-connected on the outside to the support.

FIG. 5 and FIG. 6 show an outwardly closed bearing arrangement 28 which is flange-connected on the outside to the support 13. The bearing arrangement 28 is particularly suitable for the applications on bearings of transmission shafts 29, since the bearing arrangement 28 which is preassembled and is precalibrated in terms of measuring technology can be placed onto a housing 33 from the outside. The bearing arrangement 28 has a measuring sleeve 30 of bowl-like configuration having a closed base 31, a hollow-cylindrical section 32 and a flange 10. The bearing arrangement 28 and the housing 33 are closed to the outside by the measuring sleeve 30. The seat of the bearing arrangement 28 on the housing is sealed by means of a seal 34.

On the inside, the measuring sleeve 30 has a raceway 40 for the rolling bodies 5. Furthermore, the bearing is provided with an inner ring 35 of bowl-like configuration. The inner ring 35 is seated in the transmission shaft 29 which is configured in this case as a machine element 36. The sensor system 19 or a measuring element 37 is seated optionally on the flange 10 (FIG. 5) or on the hollow-cylindrical section 32 (FIG. 6).

Bearing arrangements are also provided, in which both the hollow-cylindrical section and the flange are provided optionally on the inside or outside with measuring elements.

Figure 7:
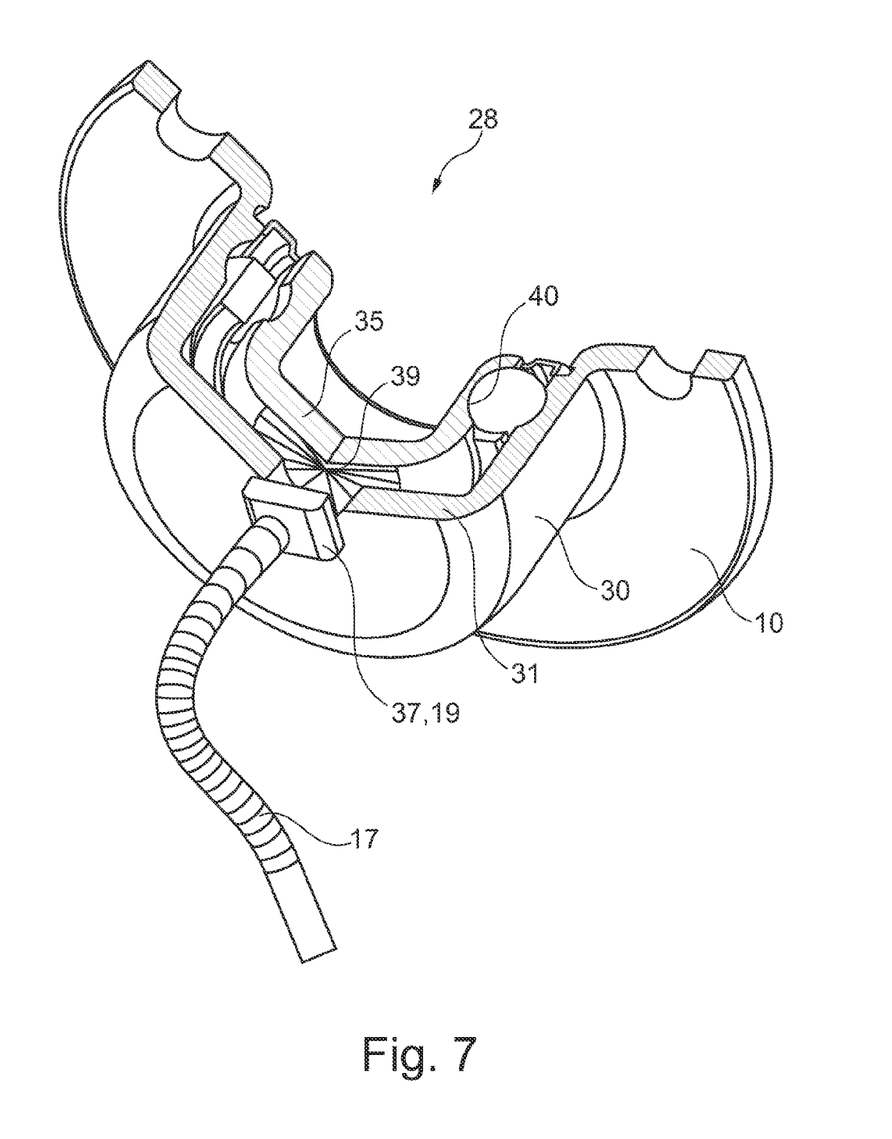
FIG. 7 illustrates an alternate embodiment of the bearing arrangement where a measuring element or sensor system is arranged on the base of the measuring sleeve.

FIG. 7 shows an alternative refinement of the bearing arrangement 28, in which at least one measuring element 37 or a sensor system 19 is arranged on the base 31 of the measuring sleeve 30. For example, signals can be detected by way of a sensor system 19 of this type through the closed base 31 or, as shown in FIG. 7, through an opening 38. For instance, according to the example from FIG. 7, the spacing of the inner ring 35 from the measuring sleeve 30 in the axial direction can be measured. It is also conceivable that the inner ring 35 is provided on the end face with an alternatively polarized signal generator 39, with the result that the rotational speed of the shaft 29 can be measured by the sensor system 19.

FIG. 7 shows a bearing arrangement 41 having a measuring sleeve 42. On the inside, the measuring sleeve 42 receives a bearing ring 43 in the form of an outer ring. A raceway 44 for the rolling bodies 5 is formed on the outer ring on the inside. The rolling bodies 5 are guided in the cage 24 and are arranged radially between the bearing ring 43 and an inner ring 25. The inner ring 25 is seated on a machine element 26 in the form of a shaft. The measuring sleeve 42 has the radially outwardly directed flange 10 which has through holes 11 and by way of which the bearing arrangement 41 is placed on the inside or the outside on the support 13 (not shown in this case).

Figure 8:
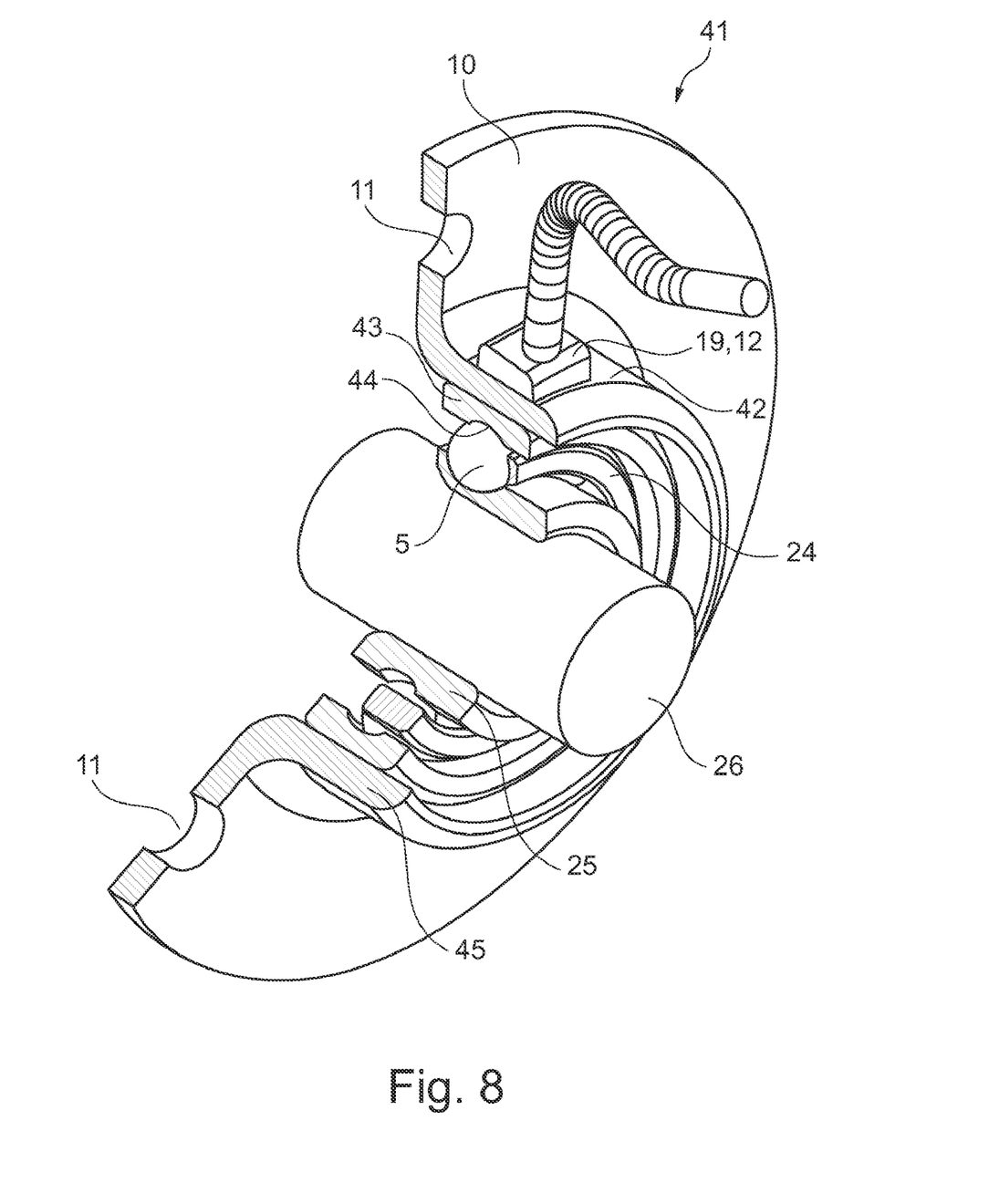
FIG. 8 illustrates the sensor system or measuring element arranged on a hollow-cylinder section of the measuring sleeve.

In the arrangement according to FIG. 8, the sensor system 19 or a measuring element 12 is arranged on a hollow-cylindrical section 45 of the measuring sleeve 42. Additionally, as an alternative, the sensor system 19 can also be fastened, for example, to the flange 10.

LIST OF DESIGNATIONS

1 Bearing arrangement
2 Bearing ring, inside
3 Measuring sleeve
4 Raceway, outside
5 Rolling body
6 Bearing ring, outside
7 Machine element
8 Hollow-cylindrical section
9 Base
10 Flange
11 Through hole
12 Measuring element
13 Support
14 Seal
15 Hole
16 Measuring elements
17 Line
18 Fastening hole
19 Sensor system
20 Raceway, inside
21 Bearing arrangement
22 Measuring sleeve
23 Raceway, inside
24 Cage
25 Inner ring
26 Machine element
27 Hollow-cylindrical section
28 Bearing arrangement
29 Transmission shaft
30 Measuring sleeve
31 Base
32 Hollow-cylindrical section
33 Housing
34 Seal
35 Inner ring
36 Machine element
37 Measuring element
38 Opening
39 Signal generator
40 Raceway, inside
41 Bearing arrangement
42 Measuring sleeve
43 Bearing ring
44 Raceway
45 Section

The invention claimed is:

1. A bearing assembly for mounting at least one machine element on a support, wherein the machine element is mounted movably on the support, the bearing arrangement comprising:
   a bearing arrangement; and
   at least one measuring sleeve having at least one measuring element, the measuring sleeve being configured separately from the support and the measuring element being provided at least for measuring physical variables and processes in the bearing arrangement;
   wherein the bearing arrangement is received on the measuring sleeve;
   wherein the bearing arrangement is fastened to the support by means of the measuring sleeve, the machine element being supported on the support by the measuring sleeve;
   wherein the measuring element is at least one sensor;
   wherein the sensor is placed onto the measuring sleeve and is provided for sensing state changes in the measuring sleeve; and
   wherein the sensor is fastened to the measuring sleeve and is directed through the measuring sleeve toward at least one signal generator which is fastened to the bearing.

2. The bearing assembly of claim 1, wherein the measuring sleeve has at least one raceway for a row of rolling bodies of the bearing arrangement.

3. The bearing assembly of claim 2, wherein the raceway is configured circumferentially on the outside of the measuring sleeve.

4. The bearing assembly of claim 2, wherein the raceway is configured circumferentially on the inside of the measuring sleeve.

5. The bearing assembly of claim 1, wherein the measuring sleeve is of bowl-like configuration and has a base.

6. The bearing assembly of claim 1, wherein the measuring sleeve which is of at least partially hollow-cylindrical configuration has a radially oriented flange, the measuring sleeve being flange-connected to the support by means of the flange.

7. The bearing assembly of claim 6, wherein the support is part of a housing, the measuring sleeve being placed axially onto the housing and the measuring sleeve protruding axially from the wall as a result.

8. The bearing assembly of claim 6, wherein the measuring sleeve protrudes with the bearing at least partially through the support.

9. The bearing assembly of claim 1, wherein the at least one sensor includes a sensor arranged on the measuring sleeve at least for sensing and forwarding measured results from measurements of the measuring element.

10. The bearing assembly of claim 1, wherein the measuring element is at least one strain element on the measuring sleeve, elastic deformation being measured in the measuring sleeve by way of the strain element, and the deformations being reactions from displacements in the measuring sleeve as a result of loads on the machine element.

11. The bearing assembly of claim 1, wherein the sensor is at least one temperature sensor.

12. The bearing assembly of claim 1, wherein the sensor is directed toward a signal generator which can move relative to the sensor.

13. The bearing assembly of claim 1, wherein the measuring sleeve receives a bearing ring, the bearing ring having at least one raceway for a row of rolling bodies.

14. The bearing assembly of claim 13, wherein the bearing ring is an outer ring, the outer ring being received in the measuring sleeve.

\* \* \* \* \*